(12) United States Patent
Dehner et al.

(10) Patent No.: US 6,298,094 B1
(45) Date of Patent: Oct. 2, 2001

(54) METHOD AND APPARATUS FOR POWER CONTROL IN A TRANSMITTER

(75) Inventors: Leo George Dehner, Southlake; James Wesley McCoy, Richland Hills, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/050,447

(22) Filed: Mar. 30, 1998

(51) Int. Cl.[7] .................................................. H04L 27/04
(52) U.S. Cl. ............................................................ 375/295
(58) Field of Search ..................................... 375/295, 298, 375/261, 130, 146

(56) References Cited

U.S. PATENT DOCUMENTS

| | | | |
|---|---|---|---|
| 5,343,499 | * 8/1994 | Jasper et al. | 375/261 |
| 5,371,481 | * 12/1994 | Tiittanen et al. | 332/103 |
| 5,381,449 | 1/1995 | Jasper et al. . | |
| 5,606,285 | * 2/1997 | Wang et al. | 370/134 |
| 5,694,431 | 12/1997 | McCoy . | |
| 5,870,436 | * 2/1999 | Kolanek et al. | 375/316 |

* cited by examiner

*Primary Examiner*—Chi Pham
*Assistant Examiner*—Kevin M Burd
(74) *Attorney, Agent, or Firm*—R. Louis Breeden

(57) ABSTRACT

A processor (120) receives an input signal including symbols for transmission, and determines an output signal for a symbol period from a predetermined range of symbols of the input signal in combination with a modulating phasor vector and a matrix of filter coefficients. The processor compares samples of the output signal with a predetermined amplitude limit; and, in response to a sample of the output signal exceeding the predetermined amplitude limit, adjusts the symbols of the predetermined range of symbols that are not pilot symbols by an adjustment factor, thereby creating a new input signal. If a sample of the output signal exceeds the predetermined amplitude limit, the processor computes a new output signal from the new input signal in combination with the modulating phasor vector and the matrix of filter coefficients; and generates a power-controlled modulated radio signal from the new output signal.

14 Claims, 1 Drawing Sheet

METHOD AND APPARATUS FOR POWER CONTROL IN A TRANSMITTER

FIELD OF THE INVENTION

This invention relates in general to wireless communication systems, and more specifically to a method and apparatus for power control in a transmitter.

BACKGROUND OF THE INVENTION

Wireless telecommunications systems sometimes are divided into a series of cell areas covering a service area. Each cell area has a transmitting base station using an operating frequency set comprising a plurality of radio channels to communicate with mobile subscribers. Each channel represents an information signal at a particular frequency carrier or band.

In many instances it is advantageous to combine these channels for transmission purposes. The channels can all be combined by a broadband signal combiner into a multichannel signal at low power levels and then amplified by a single linear amplifier (or its equivalent, a plurality of linear amplifiers in parallel, each amplifying a reduced power version of the same multi-channel signal) to raise the multi-channel signal to an appropriate transmit power level.

Peak to average ratio compression is a technique of improving average power levels from a transmitter with limited peak power capability. Traditionally, this has been accomplished with adaptive gain control and clipping. These techniques create frequency domain splatter and increase the noise floor of the transmitted signal. In addition, such techniques are not very useful for amplitude modulated signals, which require a high degree of linearity. Thus, a need exists for a method and apparatus for power control in a transmitter that can maintain linear transmitter operation while increasing the average power output of the transmitter.

SUMMARY OF THE INVENTION

An aspect of the present invention is a method for power control in a transmitter. The method comprises the steps of receiving an input signal comprising symbols for transmission, and determining an output signal for a symbol period from a predetermined range of symbols of the input signal in combination with a modulating phasor vector and a matrix of filter coefficients. The method further comprises the steps of comparing samples of the output signal with a predetermined amplitude limit; and, in response to a sample of the output signal exceeding the predetermined amplitude limit, the step of adjusting the symbols of the predetermined range of symbols that are not pilot symbols by a first adjustment factor, thereby creating a new input signal. The method further comprises, in response to the sample of the output signal exceeding the predetermined amplitude limit, the steps of computing a new output signal from the new input signal in combination with the modulating phasor vector and the matrix of filter coefficients; and generating a power-controlled modulated radio signal from the new output signal.

Another aspect of the present invention is a transmitter with improved average power. The transmitter comprises a processor for receiving an input signal comprising symbols for transmission. The processor is programmed to determine an output signal for a symbol period from a predetermined range of symbols of the input signal in combination with a modulating phasor vector and a matrix of filter coefficients, and to compare samples of the output signal with a predetermined amplitude limit. In response to a sample of the output signal exceeding the predetermined amplitude limit, the processor is further programmed to adjust the symbols of the predetermined range of symbols that are not pilot symbols by a first adjustment factor, thereby creating a new input signal; and to compute a new output signal from the new input signal in combination with the modulating phasor vector and the matrix of filter coefficients. The transmitter also includes an exciter coupled to the processor for generating a power-controlled modulated radio signal from the new output signal.

DETAILED DESCRIPTION OF THE DRAWING

Figure 1:
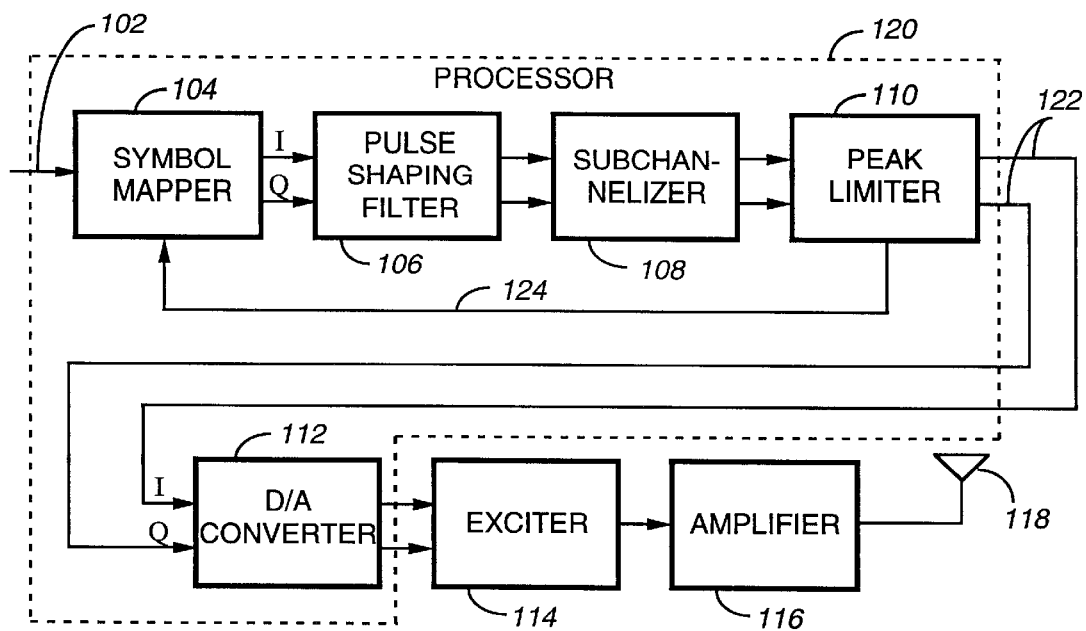
FIG. 1 is an electrical block diagram of a transmitter in accordance with the present invention.

Referring to FIG. 1, an electrical block diagram depicts an exemplary transmitter 100 in accordance with the present invention, including a processor 120 which receives an input signal comprising symbols, preferably in a plurality of symbol streams corresponding to a plurality of subcarriers, for transmission at an input 102. The transmitter 100 also includes a conventional exciter 114 coupled to the processor 120 for generating a power-controlled modulated radio signal, preferably a multiple-subcarrier power-controlled modulated signal, from the output signal of the processor 120 by up-converting the output signal of the processor 120. An amplifier 116, preferably a conventional linear amplifier, is coupled to the exciter 114 for amplifying the power-controlled modulated radio signal prior to transmission from an antenna 118 coupled to the output of the amplifier 116.

In the preferred embodiment of the present invention, the processor 120 comprises a symbol mapper 104 for mapping the symbol streams received at the input 102 into real (I) and quadrature (Q) signals, for forming a pilot symbol assisted quadrature amplitude modulated (PSA-QAM) signal. The symbol mapper 104 is coupled to a conventional pulse shaping filter 106 for controlling the symbol bandwidth. The output of the pulse shaping filter is coupled to a subchannelizer 108 for modulating the filtered PSA-QAM signal by the proper subcarrier frequencies, through well-known techniques. The output of the subchannelizer 108 is coupled to a peak limiter 110 for controlling the peak power of the transmitter output in accordance with the present invention, as will be described further below. The peak limiter 110 is coupled to the symbol mapper 104 by a feedback path 124 for providing feedback to the symbol mapper 104 for adjusting the amplitude of the mapped symbol streams according to the requirements of the peak limiter 110. The output 122 of the peak limiter 110 is coupled to a conventional digital to analog (D/A) converter 112 for converting the digital I and Q signals from the peak limiter 110 into analog I and Q signals for use by the exciter 114.

In the preferred embodiment, the processor 120 is a digital signal processor (DSP), preferably a model DSP56002, manufactured by Motorola, Inc. of Schaumburg, Ill. Also preferably, the symbol mapper 104, the pulse shaping filter 106, the subchannelizer 108, the peak limiter 110, and the D/A converter are realized in the DSP, executing software readily written by one of ordinary skill in the art, given the teachings of the instant disclosure. It will be appreciated that, alternatively, other similar DSPs can be substituted for the processor 120. It will be further appreciated that, alternatively, some or all of the symbol mapper 104, the pulse shaping filter 106, the subchannelizer 108, the peak limiter 110, and the D/A converter can be realized in hardware instead of through software programming of the DSP. The following provides a more detailed description of the algorithms utilized in the preferred embodiment in accordance with the present invention.

In peak power limited systems, the transmitted peak to average power ratio determines the maximum average power of a transmission, and therefore, is equivalent to receiver sensitivity in determining coverage for a given transmitter configuration. In accordance with the present invention, the coverage is improved by distorting the transmitted signal somewhat in order to improve the peak to average power ratio.

The output of a single subchannel QAM transmitter over a symbol period can be expressed as a matrix multiplication:

$$\Phi Hs = y \qquad (1),$$

where $\Phi$ is the modulating phasor vector, representing the effect of the subchannelizer 108 on the output vector y:

$$\Phi = \begin{bmatrix} e^{j(\omega n T_s + \phi)} & 0 & \cdots & 0 \\ 0 & e^{j(\omega(n+1)T_s + \phi)} & 0 & \vdots \\ \vdots & 0 & \ddots & 0 \\ 0 & \cdots & 0 & e^{j(\omega(n+m-1)T_s + \phi)} \end{bmatrix}, \qquad (2)$$

where n is the current symbol pointer, $T_s$ is the sample period, and H is a matrix of filter coefficients that describe the pulse shaping filter 106:

$$H = \begin{bmatrix} h(1) & h(I+1) & & h((N_s-1)I+1) \\ h(2) & h(I+2) & & h((N_s-1)I+2) \\ \vdots & \vdots & \ddots & \vdots \\ h(I) & h(2I) & & h(N_s I) \end{bmatrix}, \qquad (3)$$

where I is the interpolation rate, i.e., the number of samples per symbol, and $N_s$ is the number of symbols affecting the output at each instant in time. The character s represents the input symbol vector:

$$s = \begin{bmatrix} s(n) \\ s(n+1) \\ \vdots \\ s(n+N_s-1) \end{bmatrix}. \qquad (4)$$

The character y represents the output vector for a symbol period:

$$y = \begin{bmatrix} y(nI) \\ y(nI+1) \\ \vdots \\ y(I(n+1)-1) \end{bmatrix}. \qquad (5)$$

The task of the peak limiter 110 is to compute the output vector, y, and then compare the amplitude of each element to a predetermined amplitude limit, $T_{max}$. If the amplitude for a given output, y(i), exceeds the predetermined amplitude limit, an adjustment factor $\Delta$ is calculated to set the amplitude to the level of the predetermined amplitude limit:

$$\hat{s} = \Delta s \qquad (6),$$

where $\Delta$ is given by the following expression:

$$\Delta = I - \left(1 - \frac{T_{max}}{\max|y|}\right) \frac{h_i^H h_i}{h_i h_i^H}, \qquad (7)$$

where I is the identity matrix, $h_i^H$ is the Hermitian of $h_i$, and $h_i$ is the ith row of the H matrix modified so that the pilot symbols are not adjusted, i.e., 0 is used for pilot symbol positions:

$$h_i = [h(i)h(i+I)h(i+2I)0h(i+4I)h(i+5I)h(i+6I)\ldots] \qquad (8).$$

The calculations are then repeated, and a new output vector corresponding to the adjusted symbols is computed:

$$\Phi H \hat{s} = \hat{y} \qquad (9).$$

The calculations are repeated until the entire vector, y, is below the predetermined amplitude limit.

The algorithm performed by the processor 120 then, comprises the steps listed in Table 1.

TABLE 1

Peak Limiting Algorithm n=current symbol index
Step 1: Compute output vector, y, for samples, nI . . . I(n + 1) − 1, via Equation 1.
Step 2: If the maximum value of y exceeds the predetermined amplitude limit,
    { Adjust symbol vector according to Equation 6.
    { Compute a new output vector via Equation 9.
    { n remains unchanged.
    { Return to Step 1.
Otherwise,
    { If the symbols for this symbol index, n, were adjusted,
    { { n = n − Ns + 1
Otherwise
    { { n = n + 1
    { Endif
    { Return to Step 1.
Endif Note that the previous output vectors involving the adjusted symbols are recomputed and will be adjusted if the maximum value of y corresponding to the previous output vectors exceeds the predetermined amplitude limit.

The output for multiple subchannel modulation can be expressed in a similar manner:

$$\Phi_m H_m s_m = y \qquad (9),$$

where $$\Phi_m = [\Phi_{sc1} \; \Phi_{sc2} \; \cdots \; \Phi_{scn}], \qquad (10)$$

$$H_m = \begin{bmatrix} H_{sc1} & 0 & \cdots & 0 \\ 0 & H_{s2} & \ddots & \vdots \\ \vdots & \ddots & \ddots & 0 \\ 0 & \cdots & 0 & H_{scn} \end{bmatrix}, \qquad (11)$$

$$s_m = [s_{sc1} \; s_{sc2} \; \cdots \; s_{scn}]^T. \qquad (12)$$

The algorithm for multiple subchannels is iterated in the same way as the single subchannel algorithm.

The present invention advantageously has made a significant improvement in the link budget without degrading adjacent subchannel performance, and without degrading channel compensation performance for the PSA-QAM system. Simulations have determined that the improvement ranges from 1.7 dB to 3.6 dB, depending upon the number of subchannels and the number of QAM levels used. This improvement advantageously translates to 18–34% fewer transmitter sites for a given receiver sensitivity.

Thus, it should be clear from the preceding disclosure that the present invention advantageously provides a method and apparatus for transmitter power control that maintains linear operation while increasing the average power output of the transmitter. Many modifications and variations of the present invention are possible in light of the above teachings. Thus, it is to be understood that, within the scope of the appended claims, the invention can be practiced other than as described herein above.

What is claimed is:

1. A method for power control in a transmitter, comprising the steps of:
    receiving an input signal comprising symbols for transmission;
    determining an output signal for a symbol period from a predetermined range of symbols of the input signal in combination with a modulating phasor vector and a matrix of filter coefficients;
    comparing samples of the output signal with a predetermined amplitude limit; and
    in response to a sample of the output signal exceeding the predetermined amplitude limit:
        adjusting the symbols of the predetermined range of symbols that are not pilot symbols by a first adjustment factor, thereby creating a new input signal;
        computing a new output signal from the new input signal in combination with the modulating phasor vector and the matrix of filter coefficients; and
        generating a power-controlled modulated radio signal from the new output signal; and
    wherein the method further comprises, in response to the predetermined range of symbols of the input signal corresponding to a current symbol index not being adjusted in the adjusting step, the steps of:
        changing the current symbol index that points to a starting point of the predetermined range of symbols to a symbol index one symbol later in the input signal, thereby creating a new predetermined range of symbols; and
        repeating the determining comparing, adjusting, and computing steps, substituting the new predetermined range of symbols in the determining and adjusting steps.

2. The method of claim 1, further comprising, prior to the generating step, the steps of:
    comparing samples of the new output signal with the predetermined amplitude limit; and
    in response to a sample of the new output signal exceeding the predetermined amplitude limit:
        adjusting the symbols of the new input signal that are not pilot symbols by a second adjustment factor, thereby creating a second new input signal; and
        computing a second new output signal from the second new input signal in combination with the modulating phasor vector and the matrix of filter coefficients.

3. The method of claim 1,
    wherein the first adjustment factor is computed for each sample period as a function of the predetermined amplitude limit, the sample of the output signal having a largest amplitude, and a plurality of filter coefficients corresponding to the predetermined range of symbols of the input signal and to the sample period, and
    wherein the adjusting step comprises for each sample period the step of multiplying the predetermined range of symbols of the input signal by the first adjustment factor.

4. The method of claim 1, wherein the determining step comprises the step of
    multiplying the predetermined range of symbols of the input signal by the modulating phasor vector and the matrix of filter coefficients to determine the output signal for the symbol period.

5. The method of claim 1, further comprising, in response to the predetermined range of symbols of the input signal corresponding to a current symbol index being adjusted in the adjusting step, the steps of:
    changing the current symbol index that points to a starting point of the predetermined range of symbols to a symbol index $N_s-1$ earlier in the input signal, thereby creating a new predetermined range of symbols, wherein $N_s$ is the number of symbols in the predetermined range of symbols; and
    repeating the determining, comparing, adjusting, and computing steps, substituting the new predetermined range of symbols in the determining and adjusting steps.

6. The method of claim 1, further comprising the step of
    generating the power-controlled modulated radio signal from the output signal, in response to no sample of the output signal exceeding the predetermined amplitude limit.

7. The method of claim 1,
    wherein the input signal comprises a plurality of symbol streams corresponding to a plurality of subcarriers, and
    wherein the method further comprises the step of concurrently processing the plurality of symbol streams to generate a multiple-subcarrier power-controlled modulated radio signal.

8. A transmitter with improved average power, comprising:
    a processor for receiving an input signal comprising symbols for transmission, wherein the processor is programmed to perform the steps of:
        determining an output signal for a symbol period from a predetermined range of symbols of the input signal in combination with a modulating phasor vector and a matrix of filter coefficients;
        comparing samples of the output signal with a predetermined amplitude limit; and,
    in response to a sample of the output signal exceeding the predetermined amplitude limit, to:
        adjusting the symbols of the predetermined range of symbols that are not pilot symbols by a first adjustment factor, thereby creating a new input signal; and
        computing a new output signal from the new input signal in combination with the modulating phasor vector and the matrix of filter coefficients, and
    wherein the transmitter further comprises:
        an exciter coupled to the processor for generating a power-controlled modulated radio signal from the new output signal; and
    wherein the processor is further programmed, in response to the predetermined range of symbols of the input signal corresponding to a current symbol index not being adjusted in the adjusting step, to perform the steps of:

changing the current symbol index that points to a starting point of the predetermined range of symbols to a symbol index one symbol later in the input signal, thereby creating a new predetermined range of symbols; and repeating the determining, comparing, adjusting, and computing steps, substituting the new predetermined range of symbols in the determining and adjusting steps.

9. The transmitter of claim 8, wherein the processor is further programmed to:

compare samples of the new output signal with the predetermined amplitude limit; and in response to a sample of the new output signal exceeding the predetermined amplitude limit:

adjust the symbols of the new input signal that are not pilot symbols by a second adjustment factor, thereby creating a second new input signal; and compute a second new output signal from the second new input signal in combination with the modulating phasor vector and the matrix of filter coefficients.

10. The transmitter of claim 8, wherein the processor is further programmed to:

compute the first adjustment factor for each sample period as a function of the predetermined amplitude limit, the sample of the output signal having a largest amplitude, and a plurality of filter coefficients corresponding to the predetermined range of symbols of the input signal and to the sample period; and multiply, for each sample period, the predetermined range of symbols of the input signal by the first adjustment factor.

11. The transmitter of claim 8, wherein the processor is further programmed to:

multiply the predetermined range of symbols of the input signal by the modulating phasor vector and the matrix of filter coefficients to determine the output signal for the symbol period.

12. The transmitter of claim 8, wherein the processor is further programmed, in response to the predetermined range of symbols of the input signal corresponding to a current symbol index having been adjusted by the processor in the adjusting step, to perform the steps of:

changing the current symbol index that points to a starting point of the predetermined range of symbols to a symbol index $N_s-1$ earlier in the input signal, thereby creating a new predetermined range of symbols, wherein $N_s$ is the number of symbols in the predetermined range of symbols; and repeating the determining, comparing, adjusting, and computing steps, substituting the new predetermined range of symbols in the determining and adjusting steps.

13. The transmitter of claim 8, wherein the processor is further programmed to cooperate with the exciter to generate the power-controlled modulated radio signal from the output signal, in response to no sample of the output signal exceeding the predetermined amplitude limit.

14. The transmitter of claim 8, wherein the input signal comprises a plurality of symbol streams corresponding to a plurality of subcarriers, and wherein the processor is further programmed to concurrently process the plurality of symbol streams and to cooperate with the exciter to generate a multiple-subcarrier power-controlled modulated radio signal.

* * * * *